United States Patent [19]
Baginski

[11] 3,807,255
[45] Apr. 30, 1974

[54] PLASTIC BICYCLE PEDAL

[75] Inventor: Martin R. Baginski, Austinburg Township, Ohio

[73] Assignee: Ashtabula Bow Socket Company, Ashtabula, Ohio

[22] Filed: June 4, 1971

[21] Appl. No.: 150,036

Related U.S. Application Data

[63] Continuation-in-part of Ser. No. 829,997, June 3, 1969, abandoned.

[52] U.S. Cl. .............................................. 74/594.4
[51] Int. Cl............................................. G05g 1/14
[58] Field of Search......................... 74/594.4, 594.1

[56] References Cited
UNITED STATES PATENTS

| | | | |
|---|---|---|---|
| 1,535,601 | 4/1925 | Graham | 74/594.4 |
| 3,382,734 | 5/1968 | Hussey | 74/594.4 |
| 3,485,113 | 12/1969 | Adcock | 74/594.4 |

FOREIGN PATENTS OR APPLICATIONS

| | | | |
|---|---|---|---|
| 1,328,541 | 4/1963 | France | 74/594.4 |
| 434,154 | 8/1935 | Great Britain | 74/594.4 |
| 1,036,229 | 9/1953 | France | 74/594.4 |
| 1,381,966 | 11/1964 | France | 74/594.4 |
| 1,137,576 | 5/1957 | France | 74/594.4 |

*Primary Examiner*—Benjamin W. Wyche
*Assistant Examiner*—F. D. Shoemaker

[57] ABSTRACT

A bicycle pedal comprises a pedal axle and a pedal body. The pedal body includes a pedal body member, a strap and bearings. The pedal body has an upper and a lower side adapted to engage a cyclist's foot and outer sides adjacent to the upper and lower sides. The pedal body member is made from a plastic material consisting essentially of between 15 percent and 35 percent of thermoplastic rubber and 65 percent to 85 percent rubber-modified styrene. Such a pedal body member has sufficient strength to prevent deformation thereof by the force exerted by the rider's foot and also has a sufficiently high coefficient of friction to maintain the rider's foot in contact with the pedal body. The strap defines at least a portion of the outer sides for protecting the pedal body member which is formed from a plastic material. The pedal body member receives the bearing which in turn receives the pedal axle so that relative rotation between the pedal axle and the pedal body may be effected, while prohibiting relative axial movement between the pedal body and the pedal axle.

3 Claims, 12 Drawing Figures

PATENTED APR 30 1974

INVENTOR
MARTIN R. BAGINSKI
BY Yount and Tarolli
ATTORNEYS

PLASTIC BICYCLE PEDAL

The present application is a continuation-in-part of copending Application Ser. No. 829,997, filed June 3, 1969, entitled "Plastic Bicycle Pedal" and assigned to the assignee of the present invention now abandoned.

The present invention relates to a bicycle pedal having a pedal axle and a pedal body, and particularly to a pedal body having a pedal body member formed from a plastic material.

The design of a bicycle pedal having a plastic pedal body member has been complicated by certain design considerations which are important from both a commercial and operational standpoint. These design considerations include designing the pedal such that the surface which engages the rider's foot, will retain the rider's foot in a centered position thereon and prohibit it from slipping on the pedal. The coefficient of friction must be sufficient to maintain the rider's foot in contact with the pedal body.

To build a quality plastic pedal which is competitive with the quality pedals currently being marketed, it is essential that the plastic pedal body member of such a pedal be protected from abrasion. For example, when a bicycle pedal is scraped on the ground, there is abrasion of the outboard end. When such abrasion is repeatedly exerted on such a plastic pedal, it will render the pedal unsightly and perhaps inoperative.

Another consideration is that the plastic material must have sufficient structural rigidity to operate independent of other structural parts. Moreover, quality pedal design requires a construction having relatively high strength and impact resistance.

Yet another consideration essential to the design of such pedals is that the pedal body must be able to rotate about the pedal axle without binding. Such spin characteristics are essential to the marketability of pedals.

Further advantages inherent in the design of a bicycle pedal having a plastic pedal body member include the effective use of intricate die work for use in the design of such a plastic pedal body member and also the color of the plastic compounds available to manufacture such a part.

Accordingly, the principal object of the present invention is to provide a new and improved bicycle pedal which includes a pedal axle and a pedal body supported for relative rotation and wherein at least a portion of the pedal body is formed from a plastic material and which is designed such that abrasion to the pedal body is minimized by a protective strap means.

A further object of the present invention is to provide a new and improved bicycle pedal which includes a pedal axle and a pedal body supported for relative rotation and inherein at least a portion of the pedal body is formed from a plastic material having sufficient structural rigidity independent of other parts to prevent deformation thereof by the force exerted by the rider's foot and having a sufficiently high coefficient of friction to maintain the rider's foot in contact with the pedal body.

It is yet another object of the present invention to provide a new and improved bicycle pedal which includes a pedal axle and a pedal body supported for relative rotation and wherein at least a portion of the pedal body is formed from a plastic material and in which the pedal body is designed to maximize the spin characteristics of such a pedal while remaining relatively silent in operation.

A still further object of the present invention is to provide a new and improved bicycle pedal which includes a pedal axle and a pedal body supported for rotation relative to the pedal axle and wherein at least a portion of the pedal body is formed from plastic material and is designed such that the strength and impact resistance characteristics thereof are maximized.

Yet another object of the present invention is to provide a new and improved bicycle pedal which includes a pedal axle and a pedal body supported for relative rotation and wherein the pedal body includes a pedal body member formed from a plastic material and a strap means attached to the pedal body member for protecting the pedal body member from abrasion.

It is a further object of the present invention to provide a new and improved bicycle pedal which includes a pedal axle and a pedal body supported for rotation relative thereto in which the pedal body includes a pedal body member manufactured from a plastic material and a strap means manufactured from a metallic material for protecting the pedal body member from abrasion and increasing the marketability and appearance of the pedal.

It is yet another object of the present invention to provide a new and improved bicycle pedal which includes a pedal axle and a pedal body supported for relative rotation and wherien the pedal body includes a bearing member to prohibit movement of the pedal body along the rotational axis of the pedal axle while allowing relative rotation between the pedal body and the pedal axle.

Further objects and advantages of the present invention will be apparent to those skilled in the art to which it relates from the following detailed description of preferred embodiments thereof made with reference to the accompanying drawings in which.

Figure 1:
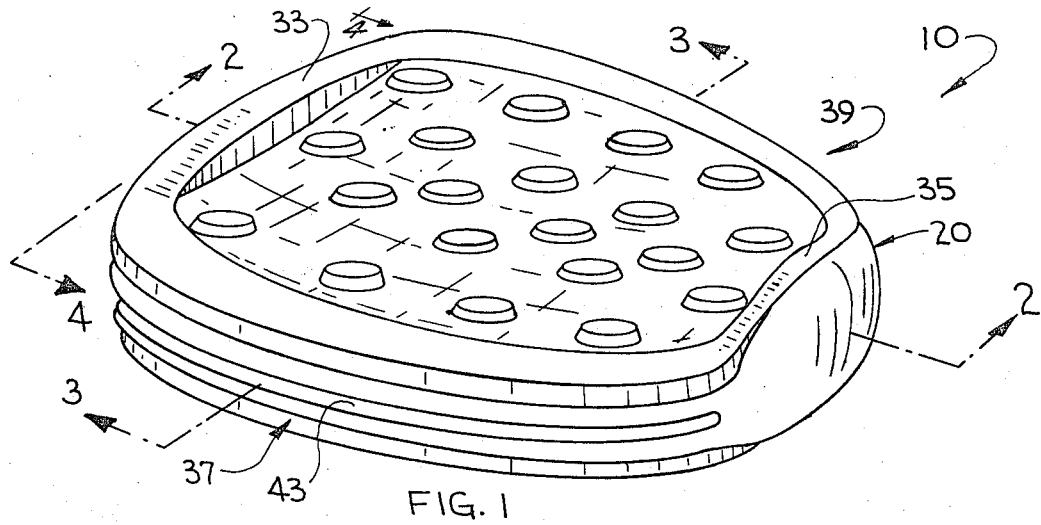
FIG. 1 is a perspective view of a bicycle pedal embodying the present invention.

The present invention provides an improved bicycle pedal having a pedal axle and a pedal body in which the pedal body includes a pedal body member which is formed from a plastic material. The improved bicycle pedal of the immediate invention minimizes abrasion of the pedal body, is designed such that the foot will remain in a centered position thereon and will not slip therefrom due to the coefficient of friction of the plastic material, has excellent spin characteristics, is simple in construction and assembly, and has increased strength and impact resistance characteristics due to the properties of the plastic material which does not require other structural parts. The present invention may be applied to pedals of a wide variety of constructions and designs and for purposes of illustration, is described and illustrated in the drawings as applied to a bicycle pedal 10 shown in FIG. 1.

Figure 2:
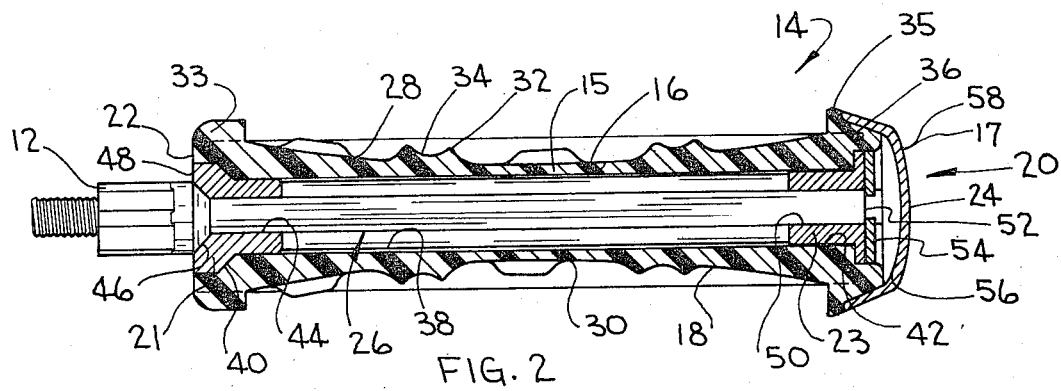
FIG. 2 is a cross-sectional view of the bicycle pedal shown in FIG. 1 taken along line 2—2 thereof.

The bicycle pedal 10 is mounted on a bicycle crank 11 and includes a pedal axle 12 as shown in FIG. 2 and a pedal body, generally indicated at 14. The pedal body 14 has an upper side 16 and a lower side 18 adapted to engage a rider's foot and outer sides 20 adjacent to the upper and lower sides 16, 18 respectively. A portion of the outer sides 20 of the pedal body 14 defines an inboard end 22 and an outboard end 24 of the pedal body 14. The pedal body 14 has an aperture, generally indicated at 26, extending from the inboard end 22 to the outboard end 24, as shown in FIG. 2 for rotatably receiving the pedal axle 12. The aperture 26 has an axis co-extensive with the rotational axis of the pedal axle 12.

The bicycle pedal body 14 also includes a strap means 17 which partially defines the outboard end 24 of the bicycle pedal body 14 and is positioned and designed such as to prevent abrasion of the plastic pedal body member 15 when the pedal is mounted on the crank 11 of a bicycle for operation thereon. Thus, when the pedal 10 comes in contact with the ground and is scraped therealong, the strap 17 will prevent abrasion of the plastic pedal body member 15.

The pedal body 14 also includes inboard and outboard bearings 21, 23, respectively mounted in the pedal body member 15. The bearings 21, 23 define a portion of the aperture 26 and are non-rotatably mounted with respect to the pedal body member 15, but are rotatably mounted with respect to the pedal axle 12. Thus, the pedal body 14 may rotate with respect to the pedal axle 12.

The pedal body member 15 is preferably formed from a plastic material. Representatively, such a pedal body member defines a majority of the upper and lower sides 16, 18 respectively which engage the rider's foot on the upper or lower surface 28, 30, respectively of the pedal body 14.

It is essential that the plastic material from which the pedal body member 15 is formed have certain physical properties. These properties include sufficient structural strength and rigidity to operate independent of other parts so that when a force is exerted on the pedal body member 15 by the rider's foot any substantial deformation and flexing of the pedal body member will be avoided. If the pedal body member 15 is allowed to flex and move as the rider uses the pedal 10, the bearings 21, 23 will move angularly with respect to each other so that they are no longer in alignment with respect to each other. When this situation occurs, rotation of the pedal body 14 with respect to the pedal axle 12 is prohibited. As the bicycle pedal is continued to be used, the bearings 21, 23 will quickly wear and in time render the pedal 10 inoperative.

The plastic material used to form the pedal body member 15 of the present invention also provides a sufficiently high coefficient of friction to maintain the rider's foot in contact with the pedal body 14. The materials used in the prior art pedals have had a low coefficient of friction and allowed the cyclist's foot to slide off the pedal.

To provide a pedal body member 15 having these properties, that is structural strength and a high coefficient of friction, it has been discovered that when a pedal body is molded from a plastic material having between 15 and 35 percent thermoplastic rubber and between 65 and 85 percent rubber-modified styrene, these favorable characteristics are obtained.

One such thermoplastic rubber which may be used to produce a pedal body member 15 in accordance with the present invention is produced and sold by the Shell Chemical Company under the trademark "Kraton" which will be herinafter refered to as Kraton for the sake of convenience. Kraton is believed to be a high modulus thermoplastic block copolymer of styrene and butadine which combines the characteristic elasticity and flexibility of vulcanized elastometers with the ability to be formed by the simplified forming techniques used with thermoplastics. Vulcanization of this elastomer is not required. Kraton is a thermoplastic rubber which is generally soft but can be supplied in various hardnesses to provide the desired characteristics. Kraton has a high coefficient of friction and is used to manufacture the pedal body member 15 of the present invention to provide a non-skid surface to engage the rider's foot.

One example of a rubber-modified styrene is produced by Union Carbide Corporation under the tradeark "Bakelite" rubber-modified styrene material which will be refered to hereinafter as rubber-modified styrene for the sake of convenience. Rubber-modified styrene is a plastic having high tensile strenght. It is generally used for injection molding parts when flexibility, strength and toughness are required. Rubber-modified styrene is compatable with thermoplastic rubber and they may be mixed together to provide an injection molded part.

It has been discovered that when a pedal body is manufactured from between 15 and 35 percent thermoplastic rubber and between 65 and 85 percent rubber-modified styrene, a pedal body is produced which has sufficient structural rigidity to operate independent of other parts to prevent deformation thereof by the force exerted by the rider's foot due to the properties of the rubber-modified styrene. Such a pedal also has a sufficiently high coefficient of friction to maintain the rider's foot in contact with the pedal body due to the thermoplastic rubber.

One particular plastic material having extremely favorable characteristics for bicycle pedals is one having 25 percent of Kraton (3200 Series) and 75 percent rubber-modified styrene (Union Carbide product Designation TMD–2100). This particuliar material has a sufficiently high coefficient of friction to maintain the rider's foot on the pedal body 14 and also has sufficient structral rigidity so as not to be deformed by the forces exerted by the rider's foot If greater friction is necessary, various configurations may be provided on the surfaces 28, 30 which will tend to hold the rider's foot on the pedal. The embodiment shown in FIG. 1–5 shows the use of "lunar cups" extending from the upper surface 28 and the lower surface 30 of the upper and lower sides 16, 18 respectively, to increase the friction between the pedal 10 and the rider's foot. The form of these cups provides a circular ridge 32 with a centrally located depression 34 which acts in a manner similar to a suction cup when the rider's foot is engaged thereon. The ridges 32 also act to dig into the rider's foot to further increase the friction therebetween.

It should be understood that the particular configuration of the surfaces need not be confined to "lunar cups" as hereinabove described, but may be of any geometric configuration which lends itself to retaining the rider's foot on the bicycle pedal body 14. It is also apparent that such a design enhances the marketability of such a pedal as opposed to conventional bicycle pedals currently being marketed.

The upper and lower surfaces 28, 30 respectively of the pedal body 14 have a concave curvature in a direction which is co-extensive with the axis of rotation of the pedal body 14 as shown in FIG. 2. This concave curvature maintains the rider's foot in a centered position on the pedal and eliminates the tendency to move either in an outboard or an inboard direction.

The upper and lower surfaces 28, 30, respectively, also have a concave curvature in a direction perpendicular to the axis of rotation of the pedal body 14. This particular concave curvature maintains the rider's foot in a centered position on the bicycle pedal body 14 and eliminates the tendency of the rider'foot to slide off the bicycle pedal 10 when he exerts a force in a direction generally tangential to the upper and lower sides 16, 18 respectively.

The upper and lower surfaces 16 and 18, respectively, may further be designed with inboard and outboard protrusions 33 and 35 respectively thereon. These protrusions extend from the upper and lower surfaces 28, 30 respectively of the pedal body member 15 and further function to center and position the rider's foot on the pedal body 14. The inboard protrusion 33 prohibits the rider's foot from moving inboard to an extent where the rider's foot would interfere with the crank 11 when operating the pedal 10 to propel a bicycle. The outboard protrusion or lip 35 provides an antiskid ridge to prohibit the rider's foot from sliding off the pedal when operating such a pedal 10. This outboard protrusion 35 is necessary, since if the rider's foot slides off the pedal, the rider's ankle or leg may be injured. The outboard protrusion 35 has an identation 36, which extends about a portion of the outer sides 20 of the pedal body member 15 to receive the strap means 17 as will be hereinafter described in connection with strap means 17.

The pedal body member 15 has an opening 38 therein which is centrally located and has an axis coextensive with the rotational axis of the pedal axle 12. The opening 38 has an inboard bearing 21 and an outboard bearing 23 respectively. Each of the openings 40, 42 has a diameter complimentary to the outside diameter of their respective bearings 21, 23 which allows the bearings 21, 23 to be pressed thereinto such that they are non-rotatably mounted in the pedal body member 15.

The inboard bearing 21 has an aperture 44 therein which defines a portion of the aperture 26 for receiving the pedal axle 12. A portion of the aperture 26 is defined by a surface 46 which is complimentary in shape to a frustroconical portion 48 of the pedal axle 12. The bearing 21 is part of the pedal body 14 and rotates therewith about the axle 12. When a force is applied in the direction of the rotational axis of the pedal body 14 towards the inboard end 22, the surface 48 absorbs the shock therefrom and prohibits the pedal body 14 from moving along the rotational axis of the pedal axle 12. It should be noted that the angle of such a surface 48 is not so small that the pedal body 15 would become locked with respect to the pedal axle 12 when such an inboard force is created. The bearing 21 is formed from a plastic material which possesses inherently favorable bearing characteristics without requiring lubrication such that the pedal body 14 may spin freely with respect to the pedal axle 12 in a silent, efficient manner.

The outboard end 24 has an opening 42 therein which non-rotatably receives the outboard bearing 23 in a manner similar to that described in connection with the inboard bearing 21. The outboard bearing 23 has an aperture 50 therein defining a portion of the aperture 26 for receiving the pedal axle 12 in a rotational manner. When the inboard bearing 21 and axle 12 are properly positioned, the outboard bearing 23 is positioned in the opening 24 and press fitted therein. This assures alignment of the bearings 21, 23 such that the rotational axis of the pedal body 14 and the pedal axle 12 will be coextensive with each other and thus maximize the spin characteristics of such a pedal. It should be understood that the bearing 23 is formed from a plastic material which possesses inherently favorable bearing characteristics without requiring lubrication such that the pedal body 14 may spin freely with respect to the pedal axle 12 in a silent, efficient manner.

In order to retain the pedal body 14 on the pedal axle 12, a groove 52 is provided in the outboard end of the pedal axle 12. A fastener 54 is pressed over the outboard end of the pedal axle 12 until it engages the groove 52. The fastener 54 also engages the outboard end 56 of the outboard bearings 23 and the outboard surface 58 of the pedal body member 15. When a force is exerted in a direction toward the outboard end 24 of the pedal body 14, the fastener means 54 will prohibit movement of the pedal body 14 while allowing relative rotation between the pedal body 14 and pedal axle 12.

The strap means 17 is formed from a metallic material as shown in FIG. 1, and encompases a portion of the outboard end 24 of the pedal body 14. The primary purpose of the strap 17 is to protect the outboard end 24 of the pedal 10 from abrasion and impact.

The strap 17 defines the outboard end 24 such that when a rider goes around a corner and scrapes the pedal on the ground, the outboard end of the bicycle pedal body member 15 will be protected thereby. If the metal strap were not present, the plastic pedal body member 15 would receive some abrasion by the ground and quickly deteriorate until the pedal 10 was inoperative. One expample of such deterioration would exist where the pedal body member wore away to a point where the fastener 54 was distorted or the pedal body 14 would not rotate about the pedal axle 12.

The strap 17 is received in the indentaion 36 of the pedal body member 15. In this manner, edges of the strap 17 are concealed. If these edges have burrs remaining thereon as a result of the process whereby they are formed, the edges will not present a dangerous condition to one utilizating such a device since they are concealed.

By covering the outboard end of the pedal body member 15, the strap 17 prohibits dirt, water, and other contaminants from entering the bearing surfaces defined by the bearings 21, 23 and axle 12. Yet another advantage provided by so positioning the strap 17 around the outboard end of the pedal body member 15 is that the unsightly appearance of the fastener 54 and the outboard end of the axle 12 is concealed thereby.

It should be understood that the metallic surface presented by the strap 17 enhances the marketability of such a pedal since the pedla appears to have a more rigid and durable quality than a plastic pedal without a metallic surface. It should also be understood that the strap 17 need only cover a portion of the outboard end 24 of the pedal body 14. The strap 17 does not perform any structural purpose, such as holding the bearing in alignment, but rather is provided to protect the pedal body member 15.

Figure 3:
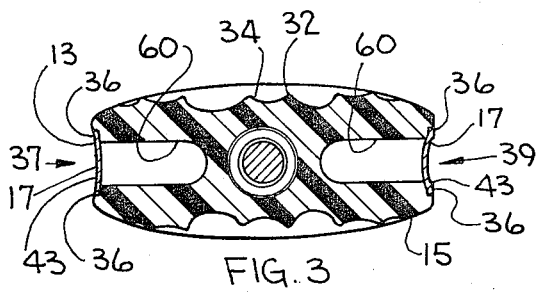
FIG. 3 is a cross-sectional view of the bicycle pedal of the immediate invention shown in FIG. 1 taken along line 3—3 thereof.

The strap 17 extends from the outboard end around a portion of the remaining outer sides 20. A section of the strap 17 is typically shown in FIG. 3. The indentations 36 in the pedal body member 15 extend from the outboard end 24 around the side portions 37, 39 of the outer sides 20 to form a recess from the strap 17. By providing the strap 17 around the side portions 37, 39 of the pedal body 14, as shown in FIG. 3, the appearance of the pedal is enhanced. To further alter the design of such a pedal 10, the depression 43 in the strap may have a luminescent paint applied thereto to provide for a luminescent surface on the outer sides 20 of such a pedal.

It should be understood that a recess 60 is provided in the pedal body member 15, as shown in FIG. 3. This recess 60 provides for maintaining the walls of the pedal body member 15 in a substantially uniform cross-sectional dimension. If the pedal body member 15 were formed by the process such as injection molding, such a design consideration is important since the cooling rate of the pedal body member 15 would be substantially uniform and thus, warpage of the part would not occur during cooling in the mold. An additional advantageous factor is that the cycle time of the injection mold machine would be decreased because the amount of material required to cool would be decreased. It should be understood that the cycle time is dependent on the thickest cross-sectional area of the part to be formed and as this maximum cross section increases, the cycle time of hte injection mold machine increases. It is yet a further advantage of such a recess 60 that the amount of material required to form the pedal body 15 is substantially decreased, thus decreasing the cost of the pedal.

Figure 4:
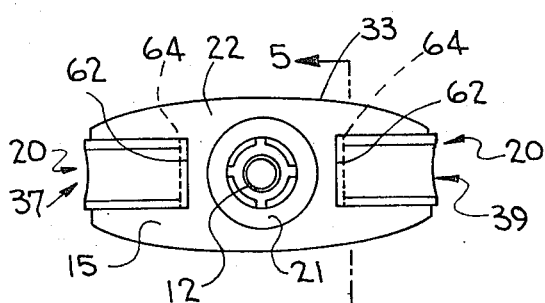
FIG. 4 is a rear view of the bicycle pedal shown in FIG. 1 taken along line 4—4 thereof.
Figure 5:
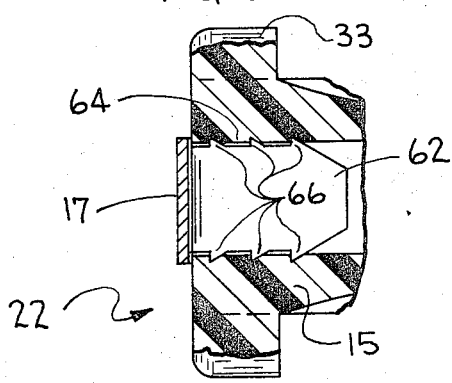
FIG. 5 is a fragmentary sectional view of the bicycle pedal shown in FIG. 4 taken along line 5—5 thereof.

The strap 17 extends around a portion of the inboard end 22, as shown in FIG. 4. The ends of the strap 17 have ears 62 thereon which are adapted to be received in complimentary slots 64 in the pedal body member 15 as best shown in FIG. 5. The ears 62 have barbs 66 such that when the ears 62 are forceably inserted in the slot 64, the strap 17 will be be fixedly retained on the pedal body member 15. The barbs 66 will prevent the ears 62 from being pulled out of the slot 64.

It should be understood that other fastening means can be used in conjunction with the strap 17 to achieve the purpose of protecting the pedal body from abrasion and enhancing the appearance of the pedal. It is apparent that other configurations of the strap 17 may be utilized to further protect the pedal body member 15.

A second respresentative embodiment is shown in FIGS. 6–9. Due to the similarity in design of the second embodiment with respect to the embodiment shown in FIG. 1 and for ease of description, common reference numerals will be used in connection with common parts with the suffix "a" appended thereto.

Figure 7:
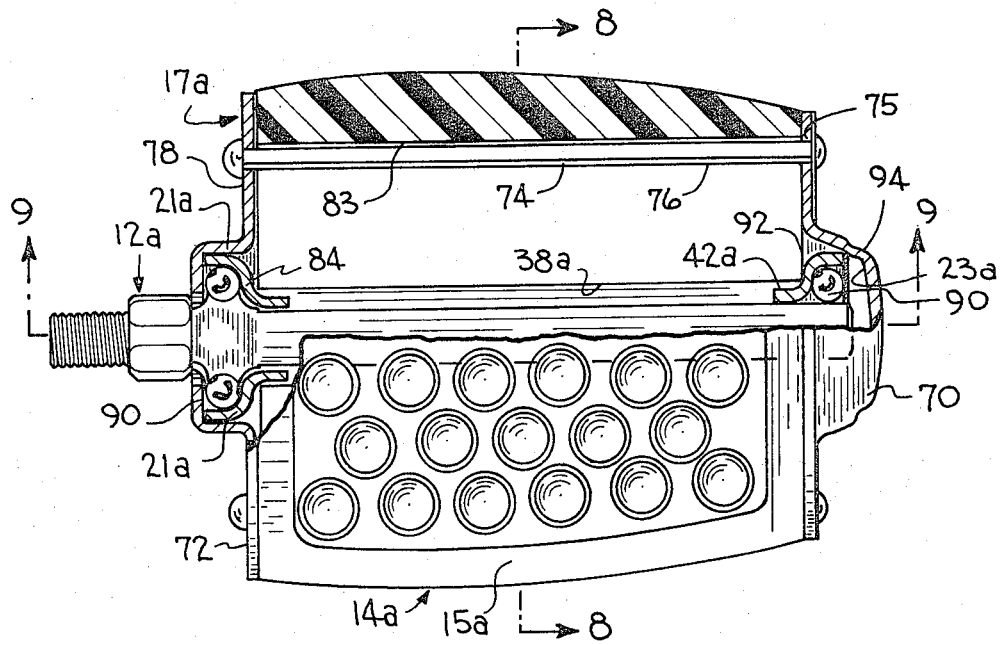
FIG. 7 is a plan view of the bicycle pedal shown in FIG. 6 having a portion thereof shown in section for ease of description.
Figure 6:
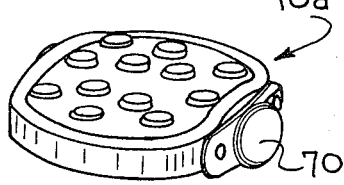
FIG. 6 is a perspective view of a bicycle pedal embodying the present invention, but of one modified construction.
Figure 8:
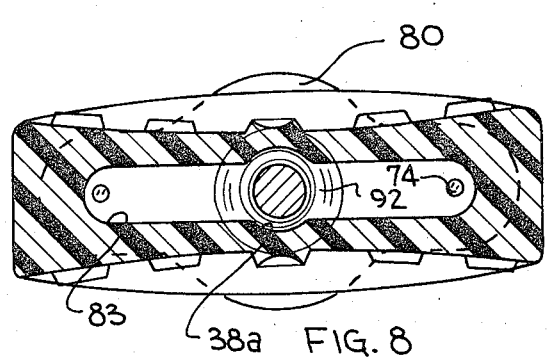
FIG. 8 is a cross-sectional view of the bicycle pedal shown in FIG. 7 and taken along line 8—8 thereof.

The pedal 10a as shown in FIGS. 6 and 7 includes a pedal axle 12a and a pedal body 14a. The pedal body 14 a includes a pedal body member 15a, strap means 17a and inboard and outboard bearings 21a, 23a, respectively.

The strap means 17a includes an outboard member 70 and inboard member 72 with clamping means 74 disposed therebetween. The outboard member 70 consists of stamped member having apertures 75 therein for receiving rods 76 of clamping means 74 therein. The rods 76 extend through the aperture 83 of the pedal body member 15a and through complimentary apertures 78 in the inboard strap member 72. Heads are then formed on one end of the rods 76 to effect securement of the inboard and outboard end members 70, 72, respectively to said pedal body member 15a.

Figure 9:
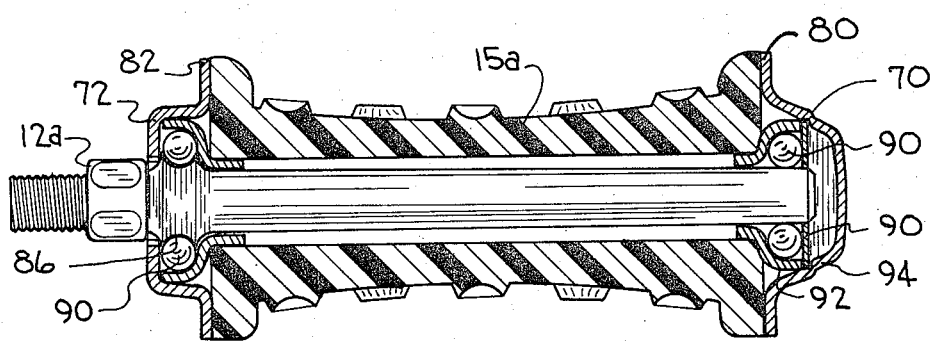
FIG. 9 is a cross-sectional view of the pedal of the modified construction as shown in FIG. 7 and taken along line 9—9 thereof.

The outboard strap member 70 has an outboard protrusion 80 as shown in FIG. 9 to prohibit the rider's foot from sliding off the pedal when operating such a pedal 10a. The inboard member 72 has an inboard protrusion 82 to prohibit the rider's foot from moving inboard to an extent where the rider's foot would interfere with the bicycle crank when operating the pedal 10a to propel a bicycle.

It should be understood that the pedal body 14a manufactured from a material as defined hereinabove that has sufficient structural strength to support a rider without deforming and also have a sufficiently high coefficient of friction to hold the rider's foot on the pedal. The pedal body member 15a has an aperture 83, a portion 38a of which is centrally located and has an axis coextensive with the rotational axis of the pedal axle 12a. An inboard opening portion 40a and an outboard opening portion 42a are provided to receive the inboard bearing 21a and outboard bearing 23a, respectively.

The inboard bearing 21a has an inboard bearing member 84 which is non-rotatably received by the opening 40a in the pedal body member 15a. The axle 12a has a groove 86 which is adapted to rotatably receive the roller or ball bearing members 90 of the inboard bearing 21a. The groove 86 is formed about the circumference of the axle 12a and is shaped to conform to the outer surface of the ball bearings 90. Thus, when the pedal is assembled, as shown in FIGS. 7 and 9, the groove 86 prohibits the pedal body from moving in a direction along the axis of rotation of the pedal body 15a since the ball bearings 90 are in communication with the inboard bearing member 84 and inboard strap member 72. Thus, means are provided on a pedal 10a to prohibit movement of the pedal body along the rotational axis of the pedal axle 12a while allowing relative rotation between the pedal axle 10a and the pedal body 14a.

In a like manner, the outboard bearing 23a includes an outboard bearing member 92, ball bearings 90 and a washer 94. The washer 94 is maintained in compression against the member 92 with the ball bearings 90 interposed therebetween. The ball bearings 90 are positioned such that the outboard end of the axle 12a bears against the ball 90 and consequently the ball 90 contact the bearing member 92 and washer 94 such that the outboard end of the axle 12a is supported in a rotatable manner.

Figure 10:
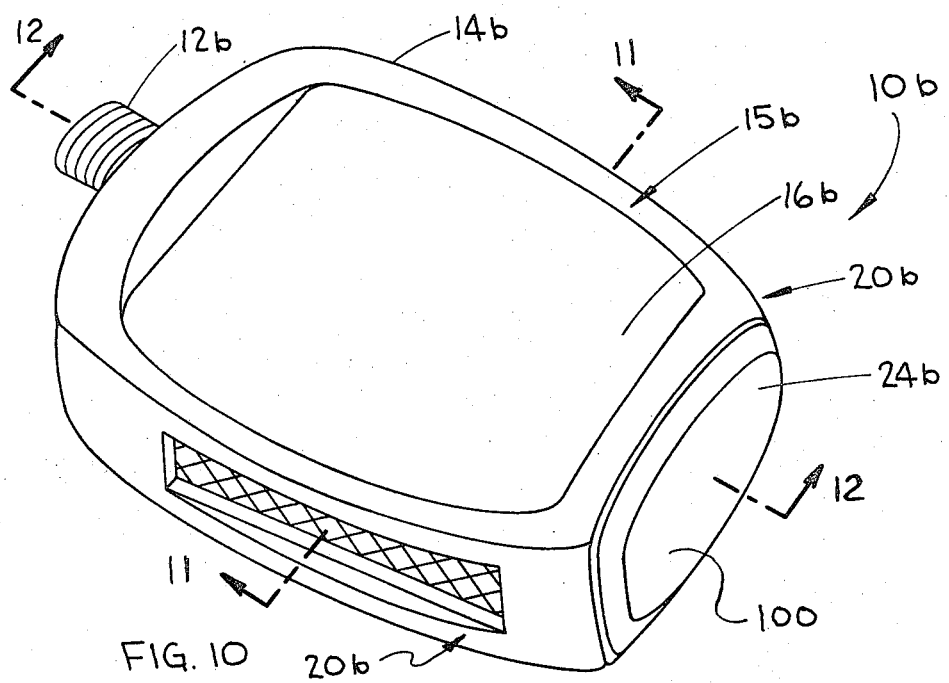
FIG. 10 is a perspective view of a bicycle pedal embodying the present invention but of another modified construction.
Figure 11:
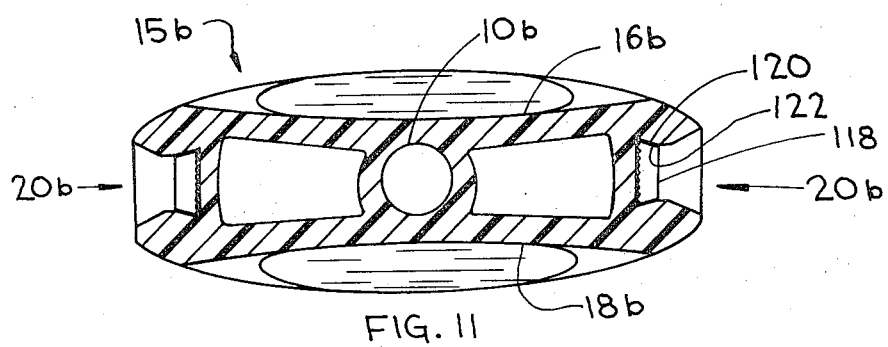
FIG. 11 is a cross-sectional view of the bicycle pedal shown in FIG. 10 taken along line 11—11 thereof.
Figure 12:
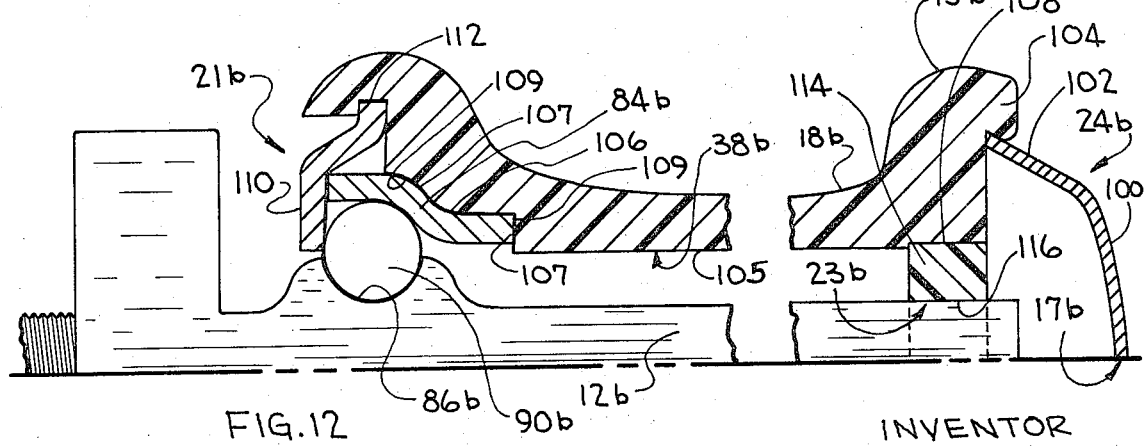
FIG. 12 is a cross-sectional view of the bicycle pedal shown in FIG. 10 taken along line 12—12 thereof.

A third representative embodiment of the present invention is shown in FIGS. 10 through 12. Due to the similarity in design of the third embodiment with respect to the embodiments shown in FIGS. 1-9 and for ease of description, common reference numerals will be used with connection with common parts with the suffix "b" appended thereto.

The pedal shown in FIG. 10 includes a pedal axle 12b and a pedal body 14b. The pedal body 14b includes a pedal body member 15b, a protective strap means 17b and inboard and outboard bearings 21b, 23b respectively as seen in FIG. 12.

The protective strap means 17b includes a member 100 which is generally formed to cover the outboard end of the pedal body member 15b. The peripheral sides 102 of the member are formed at an angle so that the groove 104 on the pedal body member 15b will grip and retain the protective strap means 17b. The member 100 protects the outboard end 24b and the pedal body member 15b in a manner hereinabove described. The groove 104 is formed in the pedal body member 15b so that the groove generally conforms to the shape of the strap means 17b. This techniuqe of retaining the strap means on the pedal body member 15b eliminates the necessity for additional structural members while still providing a strap means 17b to protect the outboard end 24b of the pedal 10b.

The pedal body member 15b has an aperture 105, a portion 38b of which is centrally located and has an axis coextensive with the rotational axis of the pedal axle 12b. An inboard opening 106 and an outboard opening 108 are provided to receive the inboard bearing 21b and outboard beaing 23b respectively.

The inboard bearing 21b has a member or outer race 84b which is nonrotatably received in the opening 106 in the pedal body member 15b. The opening 106 includes transverse surfaces 107 which extend at an angle to the rotational axis of the pedal axle 12b. The outer race 84b has surfaces 109 which are complimentary with the transverse faces 107.

The axle 12b has a groove 86b which is adapted to receive the roller or ball bearing members 90b of the inboard bearing 21b. The groove 86b is formed about the circumference of the axle 12b and is shaped to conform to the outer surface of the ball bearings 90b. When the pedal 10b is assembled as shown in FIGS. 10-12, the groove 86b prohibits the pedal body 15b from moving in a direction along the axis of rotation of the pedal body since the ball bearings 90 b are in communication with the inboard bearing member 84b and the retaining member 110 and allows a force to be transmitted therebetween. When a force is exerted on the pedal body 14b tending to move the pedal body towards the inboard end of the pedal axle 12b, the force is transmitted through the axle groove 86b to the balls 90b, outer race 84b and through the complimentary transverse surfaces 107, 109 to the plastic pedal body member 15b. If there was no transverse surface the outer race 84b would slide with respect to the pedal body member 15b and forces along the axis of the axle could not be transmitted between the pedal body 15b and the axle 12b. Thus, means are provided on the pedal 10b to prohibit movement of the pedal body along the rotational axis of the pedal axle 12b while allowing relative rotation between the pedal axle 10b and the pedal body 14b.

The retaining member 110 is provided to hold the bearings 90b in an assembled relationship with respect to the inboard bearing member 84b and the groove 86b in the axle 12b. The retaining member 110 is received by a groove 112 in the pedal body member 15b. During assembly of the bearing 21b with the pedal body member 15b, the inboard member 84 b is positioned in the pedal body member. The ball bearings 90b are then positioned in the grooves and slid into an assembled relationship with the inboard bearing member 84b. Subsequently the retaining member 110 has a portion of its outer edge snapped into the groove 112 to hold these parts in their relative assembled positioned. Thus, when a force is exerted which tends to move the pedal body 14b in a direction toward the outboard end 24b of the pedal, the ball bearings 90b contact the groove 86b and transmit that force to the inboard bearing member 84b and retaining member 110 which thereby prohibits movement of the pedal body 14b in a direction toward the outboard end 24b of the pedal.

The outboard bearing 23b includes a plastic sleeve 114 as shown in FIG. 11 which is nonrotatably received in the opening 108 of the pedal body member 15b. The bearing member 23b has a bearing surface 116 which rotatably receives the axle 12b therein. Thus, the outboard bearing member 23b rotatably supports the outboard portion of the pedal body member 15b. It should be understood that the outboard bearing 23b may be of many other different constructions and designs.

The pedal 10b has an upper and lower side 16b, 18b respectively which are adapted to engage a rider's foot and outer sides 20b adjacent to the upper and lower sides 16b, 18b respectively. As seen in FIG. 12 a reflectorized surface is provided on a portion of the outer sides 20b with the reflectors 118. The reflectors 118 are retained in the pedal body member 15b by means of the groove 120. The groove 120 is formed at an angle which matches the shape of and angle at which the sides 122 of the reflectors 118 are formed. Thus, the reflectors 118 may be simpl snapped into place in the groove 120 so that they are retained in the pedal body member 15b. It should be understood that other attaching devices well known to those skilled in the art may be used to secure the reflectors 118 to the pedal body member 15b.

It should be understood that the present invention contemplates the use of bearings as shown in U.S. Pat. No. 3,561,289 issued to the applicant of the present invention.

It should be apparent from the above that applicant has provided a highly improved bicycle pedal which includes a pedal axle and a pedal body wherein a portion of the pedal body is formed from a plastic material. The pedal of the immediate invention is designed such that it resists abrasion while retaining the rider's foot thereon in a centered position, has excellent spin characteristics and is silent in operation with favorable strength and impact resistance characteristics. The pedal body of the present invention includes a strap formed from a metallic material to protect the plastic pedal body member of the pedal body from abrasion. These plastic pedal body members include characteristics which will inherently retain the rider's foot on the bicycle pedal and in a centered position. The pedal body member of the present invention is formed from a plastic material having sufficient rigidity independent of other parts to prevent deformation thereof by the force exerted by the rider's foot and having a sufficiently high coefficient of friction to maintain the rider's foot in contact with the pedal body.

Having described my invention, I claim:

1. A bicycle pedal comprising a pedal axle and pedal body, said pedal body having upper and lower sides adapted to be engaged by a rider's foot and opposite outer sides adjacent to said upper and lower sides, said pedal body also having an inboard end and an outboard end, said pedal body including a one-piece pedal body member, said pedal body member formed from a plastic material having sufficient structural strength to operate as a pedal body independent of other structural members, said pedal body having an aperture therein extending from said inboard end to said outboard end for rotatably receiving said pedal axle, said aperture being defined by a continuous surface of said one-piece body, said pedal axle including means thereon operable to prohibit movement of the pedal body along the rotational axis of said pedal axle while allowing relative rotation between said pedal body and said pedal axle, said pedal body including an inboard bearing member and an outboard bearing member, at least one of said bearing members formed from a plastic material, said pedal body member having an opening therein adapted to nonrotatably receive said one plastic bearing member, said one plastic bearing member having a bearing surface thereon engaging a portion of said pedal axle, strap means defining at least a portion of said outer sides of said pedal body and covering a portion thereof for the sole purpose of protecting said pedal body member, said strap means having a first portion covering the outboard end of said pedal body and which is free of supporting engagement with said outboard bearing member, said strap means having second portions extending from said first portion and entirely along said opposite sides of said pedal body and also said inboard end to effect a clamping of the strap on the pedal body, said second portions of said strap terminating short of the pedal axle on said inboard end of said pedal body.

2. A bicycle pedal as defined in calim 1 wherein the ends of said second portions of said strap have extensions thereon which are received in slots in said pedal body to retain said strap means thereon.

3. A bicycle pedal as defined in claim 1 wherein said first portion of said strap is received in a recess in the outboard end of said pedal body so that the edges thereof are not exposed.

* * * * *